2,711,997

BIS-CARBONIC ACID ESTERS OF GLYCOLS AS PLASTICIZERS FOR POLYVINYL CHLORIDE

Hans-Georg Trieschmann, Ludwigshafen (Rhine), Willibald Ender, Heidelberg, Lothar Reuter, Ludwigshafen (Rhine) Oppau, and Waldtraut Froese, Weinheim-Bergstrasse, Germany, assignors to Badische Anilin- & Soda-Fabrik Aktiengesellschaft, Ludwigshafen (Rhine), Germany No Drawing. Original application October 13, 1949, Serial No. 121,234. Divided and this application October 24, 1951, Serial No. 257,194

Claims priority, application Germany October 20, 1948

2 Claims. (Cl. 260—29.1)

This invention relates to novel compositions comprising plasticized polyvinyl chloride including copolymerization products of vinyl chlorides containing a preponderating amount of polyvinyl chloride.

It is an object of the present invention to provide novel plasticizers which will be compatible with polyvinyl chloride within a wide range yielding plastic rubberlike compositions of excellent electrical and mechanical properties and of high stability towards cold, heat and light.

We have discovered that mixed carbonic acid esters of glycols and saturated aliphatic chloro-alcohols corresponding to the general formula

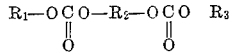

wherein $R_1$ and $R_3$ stand for the radical of a chlorinated saturated aliphatic alcohol, wherein $R_2$ stands for the radical of a glycol and wherein the total number of carbon atoms is between 6 and 18, may be most advantageously used for plasticizing polyvinyl chloride. Such esters may be prepared, for example by causing a bis-chlorocarbonic ester of a glycol, e. g. 1.3-propanediol, 1.4-butanediol, 1.5-pentanediol, methyl-1.4-butanediol, dimethyl-1.4-butanediol, 1.6-hexanediol, or chlorinated glycols, such as 3-chloro- or 2.3-dichlorobutanediol-1.4, to react with a monovalent saturated aliphatic chloroalcohol, e. g. ethylene or propylene chlorhydrine, 4-chlorobutanol-1 and its methyl substitution products or ethyleneglycol-mono-β-chlorethylether. Corresponding carbonic esters may also be prepared by causing the chlorocarbonic acid esters of the aforementioned monovalent chloroalcohols to react with a glycol as set forth above.

The incorporation of the esters according to the present invention into the polyvinyl chloride or the polyvinyl chloride containing mixed polymers may be carried out according to the conventional methods, for example by intimately mixing, if necessary at elevated temperature and/or under the addition of solvents or swelling agents. Rolling and kneading, preferably at elevated temperature, are also suitable ways for homogenizing the mixtures. The esters may also be added to aqueous emulsions of the polyvinyl chloride and incorporated therein by heating. Generally speaking, from 10 to 60 per cent of the ester, with reference to the total weight of the plastic may be incorporated. Other substances, such as conventional plastifiers, stabilizing agents, dyestuffs or fillers, may also be added in the formation of the compositions.

The polyvinyl chloride plastified according to this invention may be used for the manufacture of various shaped articles. These are distinguished by a satisfactory toughness, pliability and a good fastness to light. Depending on the field of application it is possible to influence the volatility of the ester serving as plastifier to a certain extent. If polyvinyl chloride articles are desired of high stability towards heat, it is preferable to use such esters wherein the total number of carbon atoms is between 10 and 18, whereas, if high stability to cold is desired, lower molecular esters, e. g. esters having between 8 and 12 carbon atoms, will be preferably employed.

The plastified polyvinyl chloride according to this invention may be used for the manufacture of lacquers and coating compositions. They may also be shaped in the usual manner by casting, rolling, molding, blowing or drawing. Apart from being used in the form of shaped articles, the plastics may also be employed as films, foils, tapes, for adhesives, for coating wood, metal, fabrics or paper, for manufacturing electrical insulations, oil cloth or floor covering materials.

Further details of the invention will be apparent from the following example. The parts are by weight.

Example 60 parts of polyvinyl chloride are thoroughly mixed with 40 parts of a bis-carbonic acid ester, obtained by condensing the bis-chlorocarbonic acid ester of butanediol-1.4 with γ-chlorobutanol, by rolling at 160° C. The mass thus obtained is similar to soft vulcanized rubber and distinguished by a high fastness to cold. It may be used for the manufacture of foils and films.

Similar masses are obtained when using from 30 to 50 parts of one of the following esters Bis-γ-chlorobutylcarbonate of hexanediol-1.6
Bis-γ-chloromethylbutylcarbonate of butanediol-1.4
Bis-γ-chlorobutylcarbonate of 2.3-dichlorobutanediol-1.4

This application is a division of our application Serial No. 121,234, filed October 13, 1949, now abandoned.

What we claim is:

1. A composition of matter comprising polyvinyl chloride plasticized with the compound corresponding to the formula

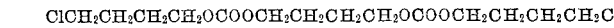

2. A composition of matter comprising polyvinyl chloride plasticized with a bis-carbonic acid ester of the general formula

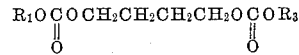

wherein $R_1$ and $R_3$ stand for the radical of a chlorinated saturated aliphatic alcohol, the chlorine atom being in the γ-position of the parent alcohol, said alcohol having from 4 to 5 carbon atoms.

References Cited in the file of this patent

UNITED STATES PATENTS

| | | |
|---|---|---|
| 2,379,252 | Muskat et al. | June 26, 1945 |
| 2,532,665 | Gage | Dec. 5, 1950 |